(12) United States Patent
Graham et al.

(10) Patent No.: US 8,412,604 B1
(45) Date of Patent: Apr. 2, 2013

(54) FINANCIAL ACCOUNT SEGMENTATION SYSTEM

(75) Inventors: Jessica Graham, Aptos, CA (US); Steven McConnell, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 208 days.

(21) Appl. No.: 12/875,972

(22) Filed: Sep. 3, 2010

Related U.S. Application Data

(60) Provisional application No. 61/239,737, filed on Sep. 3, 2009.

(51) Int. Cl.
*G06Q 40/00* (2006.01)
(52) U.S. Cl. .......................................... 705/35; 705/40
(58) Field of Classification Search ............... 705/35–45
See application file for complete search history.

(56) References Cited

U.S. PATENT DOCUMENTS

| | | | | |
|---|---|---|---|---|
| 7,818,229 | B2 * | 10/2010 | Imrey et al. ...................... | 705/35 |
| 2007/0112667 | A1 * | 5/2007 | Rucker ............................. | 705/38 |
| 2007/0124237 | A1 * | 5/2007 | Sundararajan et al. ......... | 705/38 |
| 2007/0168246 | A1 * | 7/2007 | Haggerty et al. ................ | 705/10 |
| 2007/0192165 | A1 * | 8/2007 | Haggerty et al. ................ | 705/10 |
| 2008/0109356 | A1 * | 5/2008 | Sutton et al. .................... | 705/44 |
| 2009/0070244 | A1 * | 3/2009 | Gallon ............................. | 705/34 |
| 2009/0216591 | A1 * | 8/2009 | Buerger et al. .................. | 705/7 |
| 2009/0287556 | A1 * | 11/2009 | Beirne et al. ............... | 705/14.17 |
| 2010/0306029 | A1 | 12/2010 | Jolley | |
| 2010/0306032 | A1 | 12/2010 | Jolley | |
| 2011/0035288 | A1 | 2/2011 | Clyne | |
| 2011/0183749 | A1 * | 7/2011 | Allen et al. ...................... | 463/25 |

FOREIGN PATENT DOCUMENTS

WO    2010/141255 A2    12/2010

OTHER PUBLICATIONS

Powerful eye mines the depths of consumer spending: Bertrand Marotte explains how companies use information on your purchases to their advantage—and even your disadvantage.; [Final Edition] Bertrand Marotte. The Ottawa Citizen. Ottawa, Ont.: Jan. 14, 1998. p. C.3.*
Card Companies Tap Credit Bureaus for Data Streams (Experian (Orange, CAI hopes to develop data mining tools to track the 'emerging consumer', such as start-up businesses and immigrant populations) Card Marketing Feb. 1998.*

* cited by examiner

*Primary Examiner* — William Rankins
(74) *Attorney, Agent, or Firm* — Loeb & Loeb LLP

(57) ABSTRACT

Disclosed is a method and system for optimizing an existing customer financial product account database for a financial institution. A customized product segmentation strategy based at least on the financial product account database identifies opportunities to cross-sell new credit and debit products, and increase the usage of credit and debit products among existing customers.

12 Claims, 8 Drawing Sheets

FINANCIAL ACCOUNT SEGMENTATION SYSTEM

CROSS-REFERENCES TO RELATED APPLICATIONS

This application claims priority to U.S. Provisional Appl. No. 61/239,737, filed Sep. 3, 2010, and is incorporated herein in its entirety for all purposes.

BACKGROUND

Embodiments of the present invention relate to segmentation analyses associated with demand deposit accounts (DDAs), credit and debit cards, and other banking relationships (e.g., mortgage, savings, personal loans) as customers of a financial institution, and to financial accounts in general. More particularly, embodiments of the present invention relate to the segmentation of DDAs and other relationships to increase the efficacy of financial service/product offerings to such customers.

Embodiments of the invention address these and other problems.

BRIEF SUMMARY

Embodiments of the present invention provide methods and systems for financial institutions such as banks, credit unions and the like, that allow them to match financial service offerings to their customers. The financial data is subjected to a novel and non-obvious analytical processes to identify customers and corresponding financial services/products that would be beneficial to both the customers and the financial institution.

In embodiments, an analysis is conducted on the financial and customer behavioral data of the financial institution, where variables comprising the financial data relating to all aspects of customers' accounts and behavior are collected. The variables comprising the financial data can be segmented and analyzed to model various kinds of customers who might be good candidates for financial service products and offers. In an embodiment, the financial data and behavioral data comprise data associated with the various financial institution relationships focusing on demand deposit accounts and also including debit and credit cards, mortgages, personal loans, and other offerings of a financial institution.

In a particular embodiment, variables characterizing customers' interactions and activity with a financial institution may be collected. Different subsets of the variables can then be identified from among the variables. Each subset of variables may then be further analyzed using conventional statistical modeling techniques and tools to identify values or ranges of values for each of the variables in the subset in order to model customers who are likely to respond to a given market communication or stimulus for an offer of a given financial product. A subset of variables represents characteristics common to those customers who use the given financial product. Accordingly, a customer who does not own the given financial product, but who shares those characteristics may be likely to respond favorably to an offer for the given financial product.

In an embodiment, a model may be developed that characterizes customers who might be willing to accept offers for portable payment devices such as debit cards or credit cards. A model, which may be based on the sets and/or subsets of variables may be developed that characterizes customers who might be willing to respond favorably to an offer (e.g., an offer to accept an additional credit card). A model may be targeted to customers who have not used their check card for a period of time, say for three months. Such a model may characterize such "inactive" customers who may be likely to be responsive to communications or stimuli by resuming use of their check card, or to otherwise be incentivized to use their check card.

In embodiments, sources of data other than the DDA data of the financial institution can be used to further inform the segmentation.

DETAILED DESCRIPTION

Figure 1:
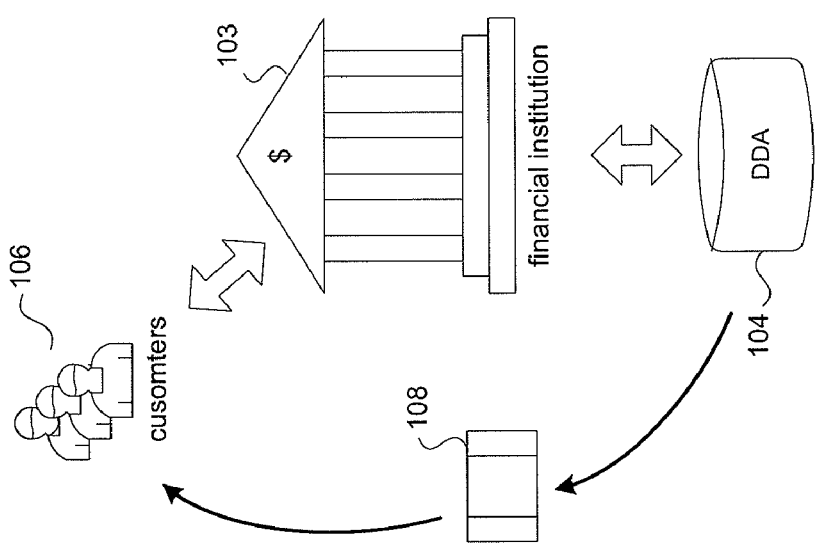
FIG. 1 illustrates an embodiment of a financial institution in accordance with the present invention.

A typical embodiment of a financial institution in accordance with the present invention is shown in FIG. 1. A high level flow for producing and validating models for product segmentation of financial data collected by the financial institution in accordance with the present invention is outlined in FIG. 2. Typically, a financial institution 102 provides its customers with various financial services and products, such as credit cards, debit cards, loan services, investment services, and so on. In an embodiment, where the financial institution 102 provides demand deposit accounts ("DDA accounts") for its customers 106, the financial institution can accumulate a wealth of information in its account database 104 which includes a data storage subsystem on which the database data is stored. Though embodiments of the present invention describe the analysis using DDA accounts. More generally, however, embodiments of the present invention are not limited to DDA accounts, but rather to financial accounts of any kind and include, but are not limited to, credit and debit card accounts, mortgage accounts, savings accounts, personal loan accounts, and other banking relationships.

Segmentation processing in accordance with the present invention may arise from a desire by the financial institution 102 to optimize its existing customer accounts; i.e., the financial institution may want to identify opportunities to offer its customers 106 various financial products 108. For example, the financial institution 102 may want to identify opportunities to cross-sell its debit products and credit products. The financial institution 102 may want to identify opportunities to increase usage of its financial products among existing customers. In an embodiment, the financial institution 102 may employ a segmentation strategy whereby segmentation and subsequent analysis are conducted on its financial data in order to facilitate identifying such opportunities.

Figure 2:
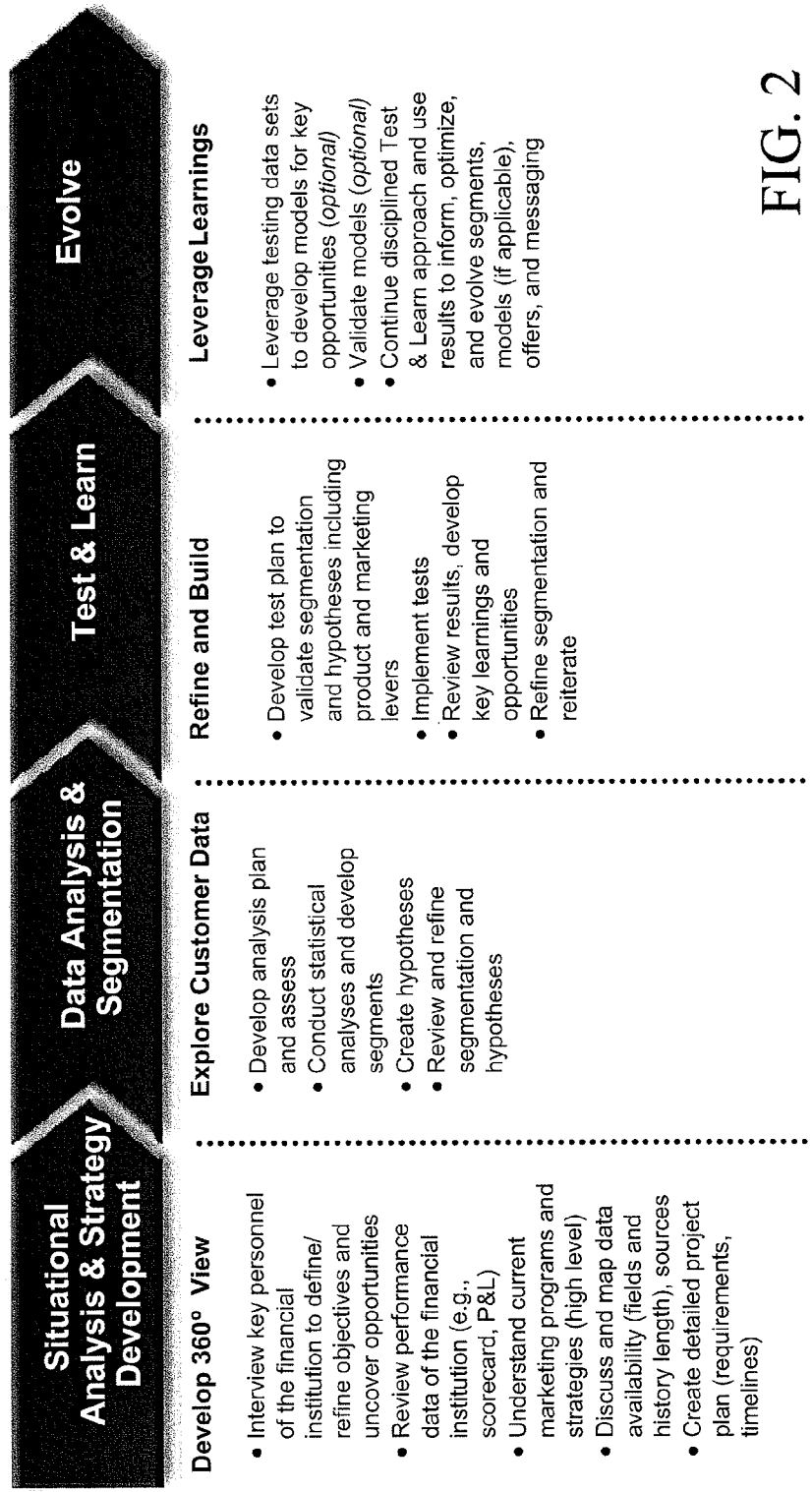
FIG. 2 shows a high level flow process of a segmentation process in accordance with an embodiment of the present invention.

Referring to FIG. 2, the process may include various tasks, and may begin with a "situational analysis and strategy development" task. This task may include interviewing various department personnel within the financial institution 102 to define and refine objectives and opportunities. This may include understanding any impediments in trying to reach those objectives. The task may include a review of the financial institution's performance data, such as scorecard and profit and loss (P&L) performance data. Successful product offerings may require an understanding of current marketing programs offered by the financial institution and how successful the current marketing programs are. A high level strategy may then be developed to introduce product offerings. An understanding of the kind of data that is available to the financial institution could be informative in the production of a project milestones and timeline chart, and data request document.

A data analysis and segmentation task can be conducted using the financial data that comprises the accounts of the financial institution 102 including DDA accounts, credit and debit accounts, mortgage, loan, and savings accounts ("account data"). An analytical plan may be developed and assessed. Statistical analyses can then be conducted on the account data and will segment the data to produce models for identifying customers as targets of product offering efforts. Each model may indicate a propensity for a given financial product or offer. Hypotheses may be created to explain the current and likely future behavior of the models and segments.

A "test and learn" effort may then be conducted to test the hypotheses. This task may include developing test plans in order to validate the segmentation and resulting models. Results from the tests can then be reviewed, and a refinement of the segmentation and/or hypotheses can then be made.

An end task might be to use the test results to develop still further refinements of the models that were developed during the data analysis and segmentation task. Hence, this task can be referred to as "evolving" the models, which might arise as a result of conducting validation testing of the models and making further refinements in testing the hypotheses.

Figure 3:
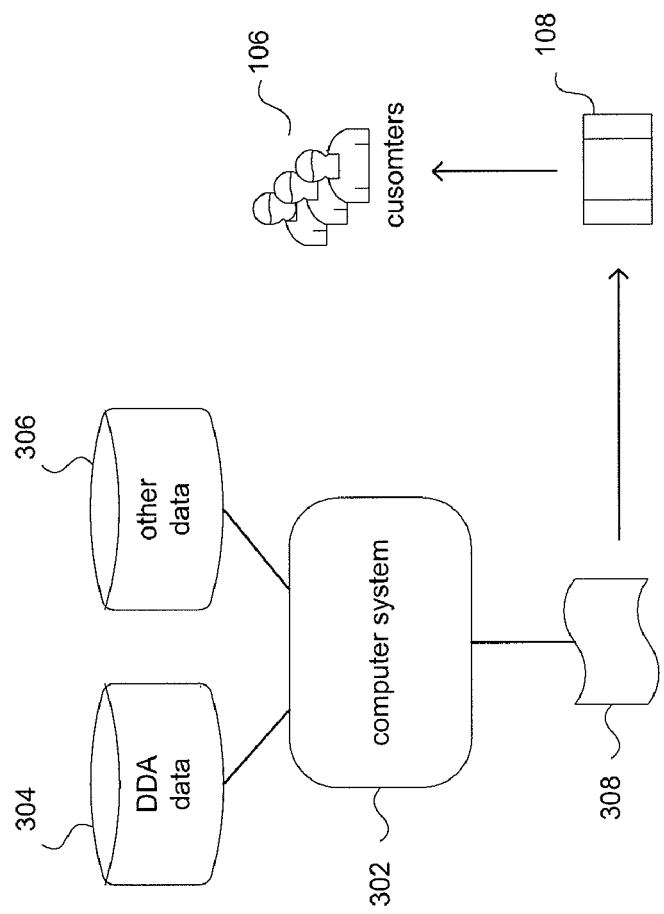
FIG. 3 illustrates an embodiment of a data system in accordance with the present invention.

Referring to FIG. 3, an embodiment in accordance with the present invention may include a conventional computer system 302 connected to one or more sources of financial data. In an embodiment, the account database 304 comprises the account information for all accessible accounts held by the customers 106 of financial institution 102. The account database 304 may constitute one such data source. An additional source of financial data 306 may comprise transactional data collected from transactions made by the customers 106 who own credit cards of debit cards issued by the financial institution 102. Other data that could also be used is data such as that coming from customer research, or other third party data sources. Typically, the transactional data for credit cards and debit cards are maintained and managed in a database separate from the account database 304 of the financial institution 102. It is understood that databases 304, 306 further comprise respective data storage subsystems such as hard disk drive systems on which the data comprising the respective databases are stored.

In accordance with an embodiment of the present invention, the computer system 302 may be configured to process data received from databases 304, 306 to produce one or more models 308 that may be indicative of customers' propensities to respond favorably to offerings of one or more financial products 108 which are not currently being used by those customers 106. Such financial products 108 represent opportunities for the financial institution 102 to expand its business.

Figure 4:
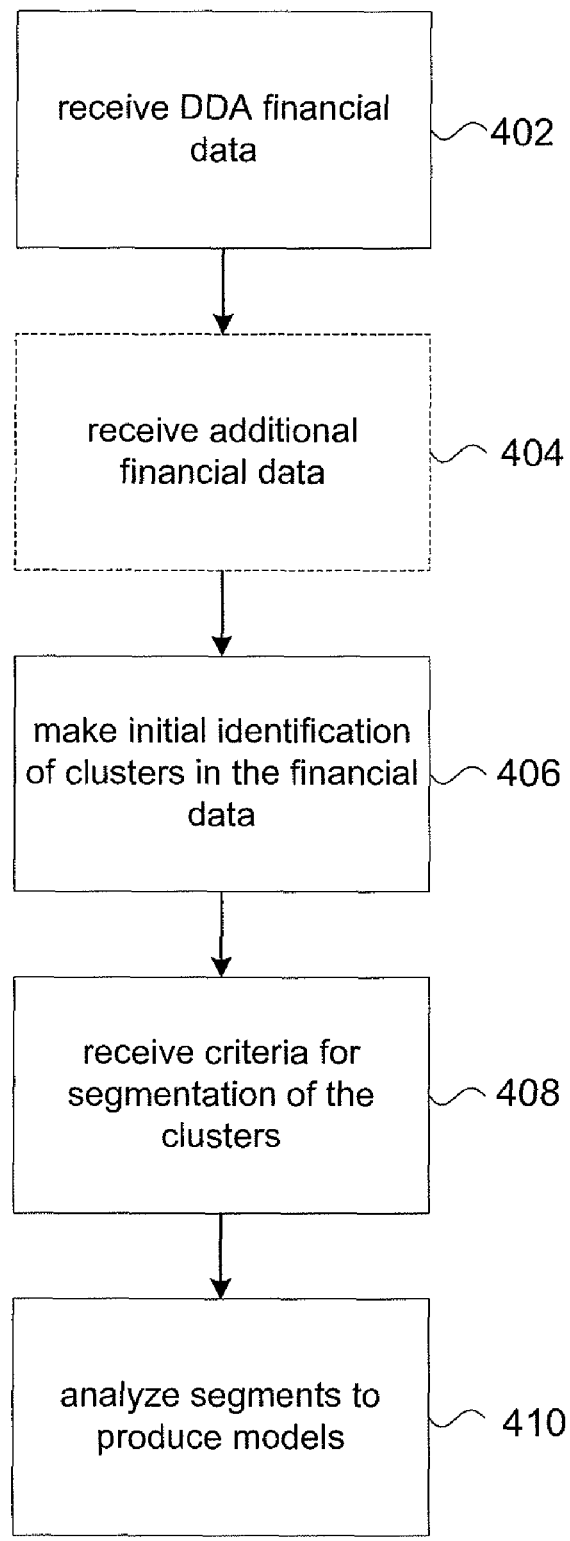
FIG. 4 illustrates a process flow for producing a cluster-driven model to implement product segmentation in accordance with the present invention.

Referring to FIG. 4, an embodiment of data processing in accordance with the present invention to develop models of customers. Each model may be viewed as representing the characteristics of a hypothetical customer who might to respond positively to a given marketing communication or stimulus for a product or offer; e.g., a credit product or a debit product. In an embodiment, the data processing may include receiving financial data in a step 402. The financial data may include account data comprising the DDA accounts of the customers 106 of the financial institution 102 in addition to other account data from credit and debit cards, loan products, and savings accounts, and so on.

In an embodiment, the accounts may comprise a large collection of variables. These variables represent various characteristics of such accounts and of the customers' relationships and interactions with the accounts, and comprise metrics such as size of account, average balance, does the customer have an online login, how often does the customer make deposits, does the customer have other loan or financial products with the financial institution, and so on. The variables also characterize the customer's behavior such as spending/savings activity, spending habits, preferences, and so on.

In accordance with the present invention, a holistic approach to the analysis is taken. Rather than focusing only on those variables characterizing a customer which relate to a specific financial product, techniques in accordance with the present invention consider a broader scope variables that characterize a customer. Any of a number of variables in the account database 104 can be used in accordance with the present invention to develop such models. Accordingly, variables which characterize behaviors and/or activities, that may not on the surface appear to have any relationship to a specific financial product of interest, may nonetheless be included in the analysis.

For example, suppose there is interest in identifying opportunities to sell a credit card service. Traditionally, the analysis might focus only on characteristics such as credit history, spending habits on a credit card, and so on. In accordance with an embodiment of the present invention, where a holistic approach is taken, characteristics not traditionally related to credit card assessment may be considered. Thus, for example, the customer's ATM (automated teller machine) usage pattern might be a characteristic that is included in the analysis. Examples of other characteristics, though certainly not an exhaustive list, include the customer's international spend on their debit card and/or credit card, the number of visits to branch, the number of log-ons to online banking, and so on.

Following is a discussion of examples of variables in the accounts (e.g., DDA accounts) that may be used by embodiments of the present invention, which by no means should be construed as being a complete list. The term "financial data" as used herein will be understood to refer to all data collected by the financial institution 102 about its customers 106 in accordance with the holistic analytical approach of the present invention, and should not be construed as being limited to traditional definitions or usages of the term.

The variables that comprise the accounts may include demographic information such as the age of the customer 102, their income, their location (e.g., residence, city, state, region in the country—east coast, midwest, etc.). The demographic information may indicate whether the account(s) held in the financial institution 102 is held under a single name or has multiple users.

Variables comprising the accounts may include account basics such as the customer's balance, how long the customer has had the account with the financial institution (tenure). Information about how the account was sourced may include information such as whether the account was opened online, or if the account was opened at a particular branch, or if the account was opened in a prior iteration of the financial institution (e.g., the financial institution might have been restructured, or was merged with another financial institution, and so on).

Account type is a variable that can inform the analytical process as to the customer's lifestage and level of engagement with the financial institution, and the like. Typical account types are student accounts, private banking accounts, bundled services accounts, investment accounts, money market accounts, CD (certificate of deposit) accounts, and so on.

Account usage information is a variable that may include information about how the customer engages with their demand deposit account. For example, usage information may include information such as demand deposit activity and deposit activity via other channels such as via a teller, ATM deposits, and so on. Account usage may also include information about withdrawal patterns, frequency of access, type of access (e.g., ACH debits, checks written), amounts (deposit, withdrawals), and so on.

Variables of the accounts may include information about other relationships that a customer 102 has with the financial institution 102 (so-called "on-us" relationships). For example, a customer might have multiple types of accounts with the financial institution in addition to their DDA account, such as a credit line account, loans (auto, home), investment accounts, and so on.

Online banking engagement types of variables may indicate a customer's propensity for online activity. Such variables include information such as how often the customer makes an online transaction (frequency), and types of online transactions (e.g., purchase, account management, etc.).

One desirable variable in the accounts may be the customer's creditworthiness. Such information may manifest itself in the form of a FICO score, or other proxy, for example.

Variables comprising the accounts may comprise characteristic information such as customers' preferences including, for example, channel preferences (online, telephone, in person, etc.), privacy, a preference for paper copy or paperless statements and other reports, and the like. The customer may prefer email communication or telephone interactions.

Variables from the accounts may include scores computed using scoring tools which typically are proprietary to the financial institution 102. Typical scores include the financial institution's own evaluation of a customer's 106 risk (e.g., risk of defaulting on credit, or defaulting on a loan, and so on). Other scores may relate to metrics indicative of likelihood of success to various marketing campaigns. An enterprise long term value (LTV, a.k.a. lifetime value) score can provide an assessment of the customer's long term value to the financial institution. This score is similar to the conventional metric known as the NPV (net present value) of a project, but for a customer.

Variables in the accounts may include any information relating to customers' relationships with other financial institutions ("off-us" relationships).

In an embodiment of the present invention, the financial institution 102 may be an issuer of credit cards or debit cards. The credit card and debit card accounts may not be linked to the account database 104, but rather to other databases managed by the financial institution 102 and combined for the purposes of creating a pool of data for analysis and inquiry. For example, credit card transactions may be stored in a credit usage database, and debit card transactions may be stored in a debit usage database. Some customers 106 may own such cards, and thus would have transactional data associated with usage of those cards in addition to their DDA account data.

Continuing with FIG. 4, such transactional data can be received (step 404) as additional financial data. Since the step may not be performed, it is shown in FIG. 4 using dashed lines. If additional financial data is received in step 404, then that data can be combined with data received from the account database 304 and together constitute the financial data that is processed in subsequent steps.

The additional financial data received in step 404 may comprise variables characterizing debit usage. For example, such variables may characterize uncarded behavior may comprise metrics which record activity with an ATM (automated teller machine), check writing activity, ACH (automated clearinghouse) transactions, deposits, and so on. The variables may include deposit or withdrawal amounts, time of transaction, location, and so on. Variables may characterize debit card transaction behavior and include metrics such as MCCs (merchant category code) indicating purchased goods/services, frequency of use of the debit card, amount of the purchase, and the like. A variable may indicate whether the customer 106 uses their signature, or PIN (personal identification number), or other mechanism to verify the transaction. The significance of PIN vs. signature is that the latter provides interchange revenue to the financial institution 102, whereas the former does not. The difference arises due to the use of different networks for processing a PIN verification as compared to processing a signature verification. Variables may characterize product details and include metrics such as rewards, what their daily spending limits (DSL) are, and the like. Still another variable may comprise a metric that characterizes overdraft activity.

The additional financial data received in step 404 may include variables characterizing credit card usage. For example, product detail variables may include interest rates on the credit card, credit limits, fees assessed against the customer, rewards awarded to the customer, product type, and so on. Variables may characterize credit card transaction behavior and record information such as MCCs (merchant category code) which identify purchased goods/services, frequency of use of the credit card, purchase amount, bill payment performance, and so on.

Continuing with FIG. 4, in an embodiment, an initial identification of clusters of customers may be realized from among the account data (and the optional additional financial data), step 406. For example, an initial clustering of the financial data may reveal a number of high level categories of customers (macro clusters) which represent high level opportunities for business expansion.

Figure 5:
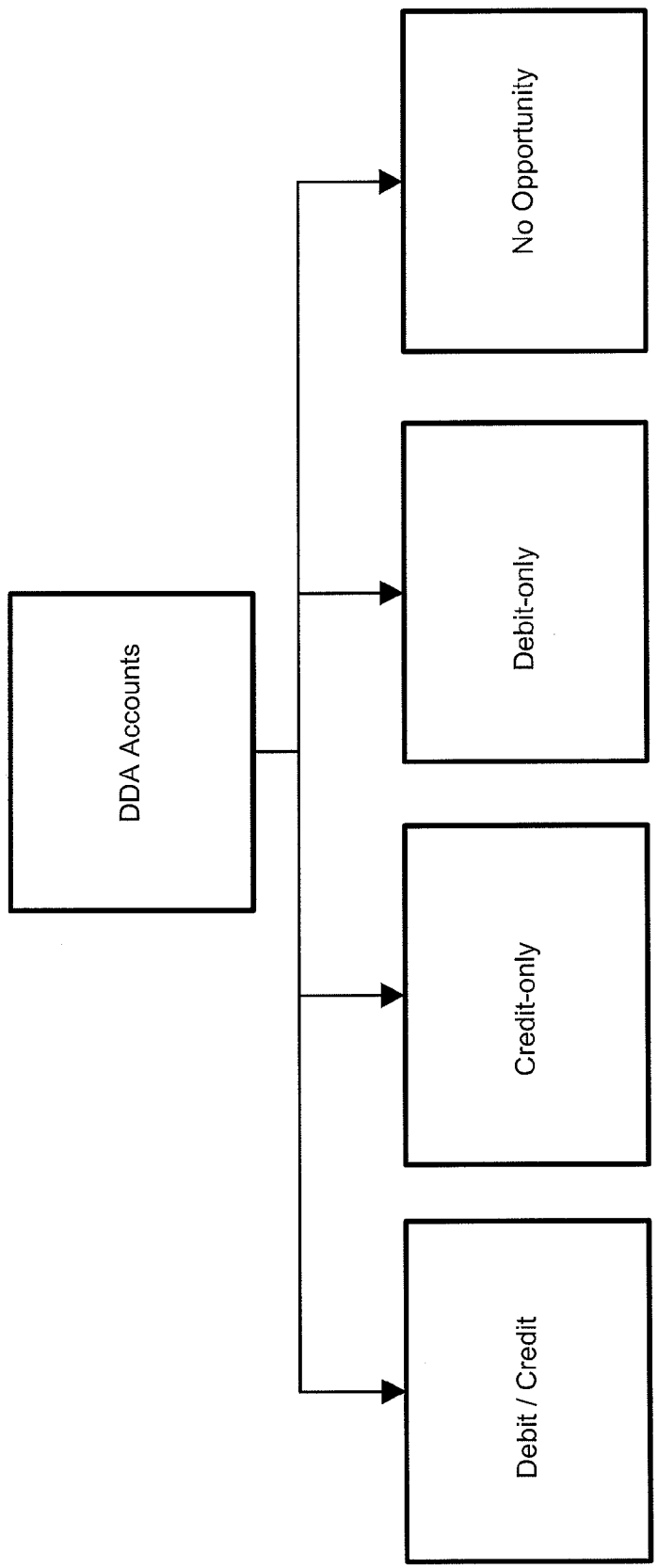
FIG. 5 illustrates a high level view of cross-sell opportunities for customers of a financial institution in accordance with the present invention.

Referring for a moment to FIG. 5, the data in the account database 304 may reveal four categories of customers: customers who own a debit product (e.g., a debit card, or a debit account such as checking account) and a credit product (e.g., a credit card); customers who own just a debit product (a debit-only customer); customers who own just a credit product (a credit-only customer); and customers who own neither a debit product nor a credit product. Thus, for customers who own both a debit and a credit product, such customers represent an opportunity to drive additional usage of their debit and credit products.

For debit-only customers, they represent opportunities to drive additional usage of their debit product or sell a credit product. Similarly, for credit-only customers, they represent opportunities to drive additional usage of the credit product, sell a debit product, or sell an additional credit product. For customers who have neither product, they may be interpreted as a category of customers who are or have been reluctant to participate in debit or credit programs and thus may represent very little opportunity for introducing debit or credit products to them since the likelihood of acceptance may be low.

Continuing with FIG. 4, criteria may be specified in step 408 to drive the development of models. In an embodiment, the criteria may be based on life cycle marketing programs for which support at each point in the life cycle may be desired. For example, one such criterion might relate to marketing programs for selling debit or credit products to the customers. This may be viewed as the beginning of the marketing life cycle. Another criterion might relate to marketing programs for selling additional credit products to customers who already own a credit product but demonstrate limited use. Another criterion might target customers who are "inactive," which can be defined as those customers who own a check card (a debit product) but who have not used the product for three or more months (or some other suitable duration of time). The goal for inactive customers might be to present offers to incentivize resumption of their use of the product.

In an embodiment, the criteria may be used to drive the identification of one or more subsets of variables from among an aggregate of variables from the financial data, a step referred to herein as "segmentation." In an embodiment, the segmentation can be conducted for each macro cluster of customers identified in step 406. In an embodiment, the aggregate of variables that is the starting point for identifying subset of variables may comprise all of the variables which comprise the financial data. In another embodiment, the aggregate of variables that is the starting point for identifying subset of variables may comprise less than all of the variables which comprise the financial data.

An output of step 408 may identify a segment of customers who have a propensity to accept an offer for a debit card and who can be characterized by a common subset of variables selected from the aggregate of variables. Another segment of customers may be identified who are likely to accept an offer for a credit card and who can be characterized by a different subset of variables. Yet another common subset of variables may characterize yet another segment of customers who are likely to accept a offer for a second credit card, and so on.

In a step 410, conventional statistical modeling techniques and analytical tools can be applied to each subset of variables identified in step 408 to further refine the subset of variables. In an embodiment, Euclidian distances can be computed and regression analysis may be performed. Refinement of the subset of variables may include assigning or associating one or more specific values, ranges of values, or sets of values to each variable in the subset, or to the subset as a whole. Variables may be numeric; e.g., customer's monthly balance, age, credit score, and so on. Variables may take on discrete values, e.g., the variable "has an online account" is a YES/NO variable, and so on. The resulting subset of variables and its corresponding assigned or associated value(s) represents a model of a hypothetical customer belonging one of the segments of customers identified in step 408; for example, a customer who is likely to accept an offer for a credit product.

Following is a discussion of some examples of segmentation processing of financial data in accordance with an embodiment of the present invention. In a particular embodiment, the financial institution 102 was a credit union having an account database comprising several hundreds of variables. The credit union included a relationship with Visa Inc. to provide credit card transaction processing services for its members. In an embodiment, the aggregate set of variables from which the subsets of variables were selected comprised about two hundred of the variables comprising the credit union's account database and variables from the Visa transactional database. Twelve months of data for each variable in the aggregate set were used in the analysis in order to factor out any seasonal effects contained the data. Customer segmentations and analyses were conducted to produce models of members 106 (credit unions refer to "members" instead of "customers") who were likely to respond positively to four types of offers: (1) offers check cards, also referred to as debit cards; (2) offers for credit cards; (3) offers for a second credit card; and (4) offer or incentives to resume use of a credit card after a period of inactivity. A model comprising subset of variables and corresponding values was produced for each type of offer.

A. Model: Check Card Offer Opportunities

The following is a model of members who are likely to respond positively to an offer for a check card. The subset of variables represents characteristics shared by members who own check cards, and thus may serve to identify potential members who may have a propensity to respond favorably to an offer for a check card. The subset of variables thus can represent an embodiment of a model that "looks like" a member who may be willing to accept an offer for a check card.

The subset of variables comprising the model may represent characteristics of a member who is likely to accept an offer for a check card. In the particular embodiment, a value associated with each variable is referred to as a "coefficient estimate." The coefficient estimate represents a degree of deviation from a mean score for that variable. Consider, for example, the variable LengthOfMbrshp (length-of-membership). Members who are likely to accept an offer for a check card are characterized in that their length-of-membership "score" is less than the mean score for that variable computed over a certain population of customers (e.g., customers in a macro cluster). The "less than" relation is represented by a negative value for the coefficient estimate. A variable associated with a positive coefficient estimate means the value of that variable is greater than the mean score for that variable. The magnitude (absolute value) of the coefficient estimate represents the amount of deviation from the mean score.

Following is a description of each variable in the subset and how that variable may have an influence on modeling the member:

IndDepositsCntMonth1TO12_total: 0.7234
    The total number of deposits into the checking account from other internal accounts in a twelve month period.
    A higher score indicates that the member is a frequent user of their checking account and thus indicates a likelihood of accepting an offer for a check card.

LengthOfMbrshp: −0.465
    The number of years (or months) since the member joined the credit union.
    The negative coefficient indicates that newer members are more likely to accept an offer for a check card, because those who have been a member for a long time and have not obtained a check card will probably not do so.

NFOIndMo12: 0.8845
    The member is signed up for online banking. This is a Yes/No variable.

The 0.8845 coefficient suggests that a member who might accept an offer for a check card is likely to have signed up for online banking.

IndTransfInCntMonth1TO12_total: 0.0426
The number of transfers into the checking account from other internal accounts.
A higher score indicates that the member who is likely to accept an offer for a check card exhibits the characteristic of somewhat frequent use of the checking account.

FICO Score:
B rating: 0.3114
C rating: 0.5144
D, E rating: 0.5749
<540: 0.6715
A lower FICO score indicates the member being modeled is not likely to qualify for a credit card, and indicating a likelihood of accepting an offer for a check card; this fact is reflected in the higher coefficient estimate for the lower FICO score.
On the other hand, a member having a higher score such as 'B' rating, is likely to own a credit card and thus not likely to need a check card; hence the lower coefficient estimate.

Member Age: −0.1447
Younger members are likely to not have a credit card, and thus are likely to accept an offer for a check card.

NFOLoginCntMo12: 0.0388
Number of times a member logged in to their DDA account during a month to access/manage the account.
A slightly higher than normal level of log in activity appears to indicate a willingness to accept an offer for a check card.

IndMMSInd: −0.8766
Indicates the presence of a money market account. This is a Yes/No variable.
The −0.8766 coefficient for this variable suggests that a member who might accept an offer for a check card is likely to not have a money market account, since a money market account is likely to be associated with an affluent member who in turn is not likely to want a check card.

AgeofMbrsMostRecentAcct: −0.0321
Age in months of the most recent account, namely how long the account has been open.
A slightly negative coefficient estimate indicates that the most recent accounts of members who might accept an offer for a check card have been open for slightly less time than the average member.

IndChecksAmtMonth1TO12_mean: 0.00171
This refers to total amount spent with checks.
The small coefficient estimate for this variable indicates that member who is likely to accept a check card offer is one who is characterized by having low check usage levels. If a member's check usage is high (this would be indicated by a high coefficient estimate), they are already heavy check users and thus may not need a check card.

CuCard_num: 0.104
The number of credit union cards held by the member.
If a member has more cards, it is more likely that they will respond favorably to another card offer.

CCATMSumDebitAmt1TO12_mean: −0.7431
Sum of ATM Debits using the credit union card.
A member who is likely to accept an offer for a check card is one who does not transact ATM debits with the credit unit card, which is characterized by the large negative coefficient estimate for this variable.

ATMVisitTotTrCntMo12 SFT: 0.0579
Total transactions made at an ATM.
The slightly positive coefficient estimate indicates that the member who is likely to accept an offer for a check card is one who tends to B. Model: Credit Card Offer Opportunities The following is a model of members who are likely to respond positively to an offer for a credit card. The subset of variables may represent characteristics shared by members who own credit cards, and thus may serve to identify potential members who may have a propensity to respond favorably to an offer for a credit card. The subset of variables thus can represent an embodiment of a model that "looks like" a member who may be willing to accept an offer for a credit card. Following is a description of each variable in the subset and how that variable may have an influence on modeling the member:

IndTransfOutCntMonth1TO12_total: 0.1599
The total number of transfers out of the checking account to other internal accounts in a twelve month period.
The member that is being modeled here is characterized by a high number of transfers out of the checking account. This may indicate the member is spending a lot, and thus is likely to accept an offer for a credit card.

LengthOfMbrshp: 0.1462
The number of years or months since the member joined the credit union.
The positive coefficient estimate indicates that members who are characterized as having been with the credit union longer than on average are likely to accept an offer for a credit card.

NFOLoginCntMo12: 0.0552
Number of times a member logged in to their DDA account during a month to access/manage the account.
A slightly higher than normal level of log in activity appears to indicate willingness to accept an offer for a credit card.

IndLNSAmt: 0.1548
End of month balance for consumer loan products such as an auto loan.
A higher balance on a member's consumer loan suggests the likelihood of accepting offers for a credit card.

MarketableMbrs: −0.3645
This variable refers to a score of negative indications such as bad alerts (e.g., missed payment), incorrect or missing address, and so on.

NFOIndMo12: 0.6267
Member is signed up for online banking.
This coefficient estimate indicates that members who are likely to accept an offer for a credit card are typically signed up for online banking.

EmpStatusCdDesc:
Still Employed: 0.1623
Retired/Receiving Annuity: 0.4735
These coefficients indicate that a retired member is more likely to accept an offer for a credit card than a non-retired member, perhaps because a retired member, having more free time, is more likely to spend than a non-retired member.

OriginDesc:
affiliation A: 0.2226
affiliation B: −0.1876 affiliation C: 0.1058 affiliation D: 0.0482

This variable indicates the member's affiliation with another person or organization. Who the member is affiliated with may indicate the member's likelihood of accepting an offer for a credit card. The specific affiliations have been anonymized for privacy.

C. Model: 2$^{nd}$ Credit Card Offer Opportunities

The following is a model of members who are likely to respond positively to an offer for a second credit card. The subset of variables may represent characteristics shared by members who own two or more credit cards, and thus may serve to identify potential members who may have a propensity to respond favorably to an offer for a second credit card. The subset of variables thus can represent an embodiment of a model that "looks like" a member who may be willing to accept an offer for a second credit card. Following is a description of each variable in the subset and how that variable may have an influence on modeling the member:

MoSinceLstDebit_MEAN: −0.011

Months Since Last Debit Transaction—This variable refers to the time since the last debit transaction was made.

The negative coefficient estimate indicates that a member who is likely to accept a second credit card is characterized by being more recently active than the average member.

PurNum1TO12_mean: 0.0812

Number of end-of-month purchase transactions—This variable refers to the number of purchases made near the end of the month; e.g., during the last week, or last five days of the month.

The slightly positive coefficient estimate indicates that a member who is likely to accept a second credit card is characterized by making more purchases at the end of the month than on average.

FCAmt1TO12_mean: 0.0282

Interest paid by the member on non credit products, such as loan products.

A member characterized by having some interest payments, as indicated by the positive coefficient estimate, suggests (1) they do not have a high interest payment debt such as a home mortgage or auto loan, and (2) that they may have borrowed some amount of money for general spending. Such a member may be amenable to accepting an offer for second credit card.

MoSinceLstAct_MEAN: 0.0210

Months Since Last Activity—This variable refers to the time since the last activity of any sort on the account was transacted.

The slightly positive coefficient estimate indicates that a member who is likely to accept a second credit card is characterized by being a bit more active on their account.

IndTransfOutCntMonth1TO12_total: 0.0226

Count of transfers out of the checking account to other internal accounts.

This particular coefficient estimate indicates that a member who is likely to accept a second credit card tends to transfer money out of their account a bit more frequently than on average.

BehavScore_mean: −0.1675

Behavior Score (Master File Risk Score)—This variable refers to a score created by the credit union and is used to facilitate decision-making in connection with product offerings, changing credit limits, and the like.

PmtAmt1TO12_mean: 0.0725

Minimum Payment Due—This variable refers to balance due on a credit card, and specifies the minimum amount due for a given billing period.

The positive coefficient estimate characterizes a member who has a bit higher balance on their credit card account than on average. Such a member is likely to accept an offer for a second credit card.

CurrCasBal1TO12_mean: 0.0134

Current Cash Balance at end of month.

The slightly positive coefficient estimate characterizes a member whose cash balance in their account is a bit higher than on average. Such a member is likely to accept an offer for a second credit card, perhaps because they have more cash on hand.

IndCDSInd: 0.0497

Indicates the presence of a CD (certificate of deposit) account.

A member who has a CD account may be more affluent and thus likely to accept an offer for a second credit card.

NFOLoginCntMo12: 0.4004

Number of times a member logged in to their DDA account during a month to access/manage the account.

A slightly higher than normal level of log in activity appears to indicate willingness to accept an offer for a second credit card.

IndMMSAmt: 0.3867

End of month balance on a money market account.

The positive coefficient estimate characterizes a member who has a higher cash balance in their money market account than on average. Such a member is likely to accept an offer for a second credit card, perhaps because they have more cash on hand.

StmtBal1TO12_mean: 0.0103

Statement Overall Balance

The slightly positive coefficient estimate characterizes a member who has a slightly higher overall balance than on average. Such a member is likely to accept an offer for a second credit card, perhaps because they have more cash on hand.

D. Model: Offer/Incentive to Resume Usage Opportunities

The following is a model of members who are deemed to be "inactive," namely members who have not used their debit cards for three or more months (of course any suitable duration of inactivity can be used) and who are likely to be influenced to resume use of their debit card. The subset of variables may represent characteristics shared by members who have not used their debit card for a given period of time, and who may be persuaded by an offer or some incentive to resume use of their debit card. The subset of variables thus can represent an embodiment of a model that "looks like" a member who may be willing to be persuaded to resume use of their debit card. Following is a description of each variable in the subset and how that variable may have an influence on modeling the member:

ATM: 0.8403

This variable refers to whether or not the member has used the ATM in the last twelve months.

A high positive coefficient indicates that a member who is likely to respond positively to an offer to resume use of their debit card is someone is actively uses an ATM.

EOM_BALANCE_M1TO12_mean: 0.0325

Average end of month balance.

The small value of this coefficient indicates a member who maintains an average level balance, which suggests that such a member maintains a relatively constant level of spending activity. Such a member may be likely to respond positively to an offer to resume use of their debit card.

VCCATMSurAmt1TO12_mean: 0.0786

Average check card ATM Surcharges—In an embodiment, each time a check card is used at an ATM of another financial institution, there is a surcharge fee that is assessed against the member. This variable represents the total surcharge fees averaged over twelve months.

The small positive value of this coefficient indicates a slightly higher than normal level of other-ATM activity. Such a member may be likely to respond positively to an offer to resume use of their debit card.

NFOLoginCntMo12: 0.0893

Number of times a member logged in to their DDA account during a month to access/manage the account.

A slightly higher than normal level of log in activity appears to indicate willingness to accept an offer to resume use of a debit card.

ATSCallsCntMo12: 0.0878

Number of times a member called in and used an automated voice service.

A slightly higher than normal level of call in activity appears indicate willingness to accept an offer to resume use of a debit card.

IndChkAmt: 0.5892

End of month balance of checking account.

A value of 0.5892 indicates the member maintains an above average balance in their checking account, which suggests they have spending potential. Such a member may be likely to respond positively to an offer to resume use of their debit card.

FICO Score:

A rating: −0.8395

C rating: 0.0998

D rating: 0.1928

E rating: 0.2003

A lower FICO score indicates the member being modeled is not likely to qualify for credit. Accordingly, such a member is going to spend cash in their checking account, and so may be likely to respond positively to an offer to resume use of their debit card.

On the other hand, a member having a higher score such as an 'A' rating, is likely to own a credit card and thus not likely to respond positively to an offer to resume use of their debit card, preferring instead to use their credit card.

Figure 6:
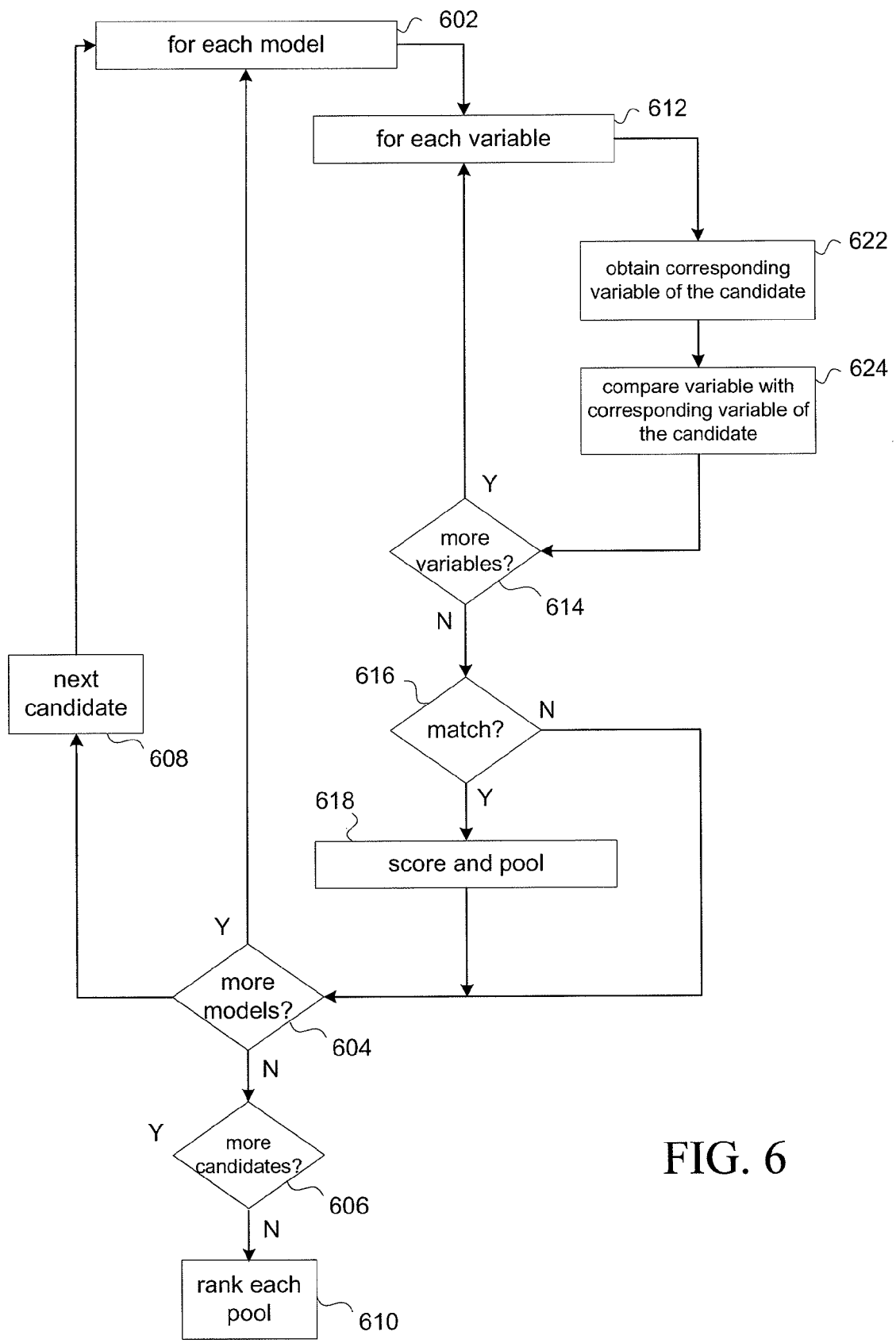
FIG. 6 illustrates a flow chart for applying models to identify customers in accordance with the present invention.

Referring now to FIG. 6, an embodiment of the present invention includes applying the above models to identify customers of the financial institution who might respond positively to the offer campaign associated with each of the models. In an embodiment, the process may comprise two loops, one nested in the other. An outer loop 602, 604 is iterated for each model to be applied. An inner loop 612, 614 is iterated for each variable comprising the model being applied ("model variables") to evaluate each model variable against a candidate customer. Thus, for example, referring for a moment to the "check card" model described above, the inner loop would be iterated sixteen times, once for each model variable (the FICO score variable comprises four variables, one for each ranking).

The model variables of the model being applied identify corresponding variables of the candidate ("candidate variables"). In step 622, a candidate variable is obtained from the account for the candidate. For example, referring to the "check card" model, in the first iteration of the inner loop 612, 614, the first model variable from the model might be IndDepositsCntMonth1TO12. The corresponding IndDepositsCntMonth1TO12 variable from the candidate's account would be retrieved.

In step 624, the model variable is evaluated against the corresponding candidate variable to determine if there is a "match" between the two variables. In an embodiment of the present invention, a "match" may be determined by conducting a comparison operation of values associated with the candidate variable the model variable. The comparison operation may factor in the corresponding coefficient estimate associated with the model variable to allow for deviations between the values of the candidate variable and the model variable. Based on the comparison operation, a match or no-match determination can be made for the candidate variable. This outcome can then be recorded for the candidate variable.

The loop 612, 614 can then be repeated for each model variable in the model that is being applied. When all of the variables of the model have been evaluated against the corresponding candidate variables, then in step 616 an assessment may be made to determine if the candidate "looks like" the model (i.e., if the candidate matches the model). In an embodiment, a "match" with the model can be deemed to have been made if all of the model's variables match the corresponding candidate variables.

In another embodiment, a "match" with the model may not require that all of the model's variables match the corresponding candidate variables. Instead, the model variables may be ranked in order of relevance. A candidate may then be deemed to "look like" the model if the n highest ranking model variables (for example, n=2) match the corresponding candidate variables. The value of n can be any suitable integer, ranging from 1 to N (N=the number of model variables in a given model). In an embodiment, a criterion for ranking the model variables may be based on their corresponding associated coefficient estimates. For example, the model variables may be ranked in decreasing order of the magnitudes of their corresponding associated coefficient estimates.

Continuing with FIG. 6, if the candidate "looks like" the model, then in step 618 a "score" for the candidate may be recorded and the candidate placed in pool of candidates corresponding to the particular model being applied. In an embodiment, "scoring" a variable may include collecting and combining the variables required for the model. Those variables are run through an algorithm that places each customer in a decile based on their match rate with the model variables. Those customers in the top deciles look the most like customers who currently demonstrate the desired behavior (e.g., have already accepted the offer of a new credit or debit card or are actively using their products).

The next model can then be applied to the candidate by repeating another iteration of the loop 602, 604. The inner loop 612, 614 may be repeated using the model variables of the next model to assess the model against the candidate. If it is determined (step 616) that the candidate "looks like" the next model, then a score can be recorded and the candidate can be placed in another pool that corresponds to the next model (step 618). This process may be repeated until each model is applied to the candidate.

The above sequence may then be performed for the next candidate customer (steps 606, 608). After all the models have been applied to all of the candidate customers, the result will be a pool of candidates for each model.

Then in a step 610, the candidates in each pool may be ranked. In an embodiment, the candidates in each pool may be ranked by deciles, namely top ten percent, top twenty percent, and so on. In an embodiment, the top ten percent of candidates in a pool may be deemed by the financial institution 102 as those candidates who most closely resemble the model that corresponds to that pool. The financial institution 102 may then decide to make offers to the candidates in the top ten percent. In other embodiments, the financial institution 102 may decide to target the top twenty percent of candidates, and so on.

Figure 7:
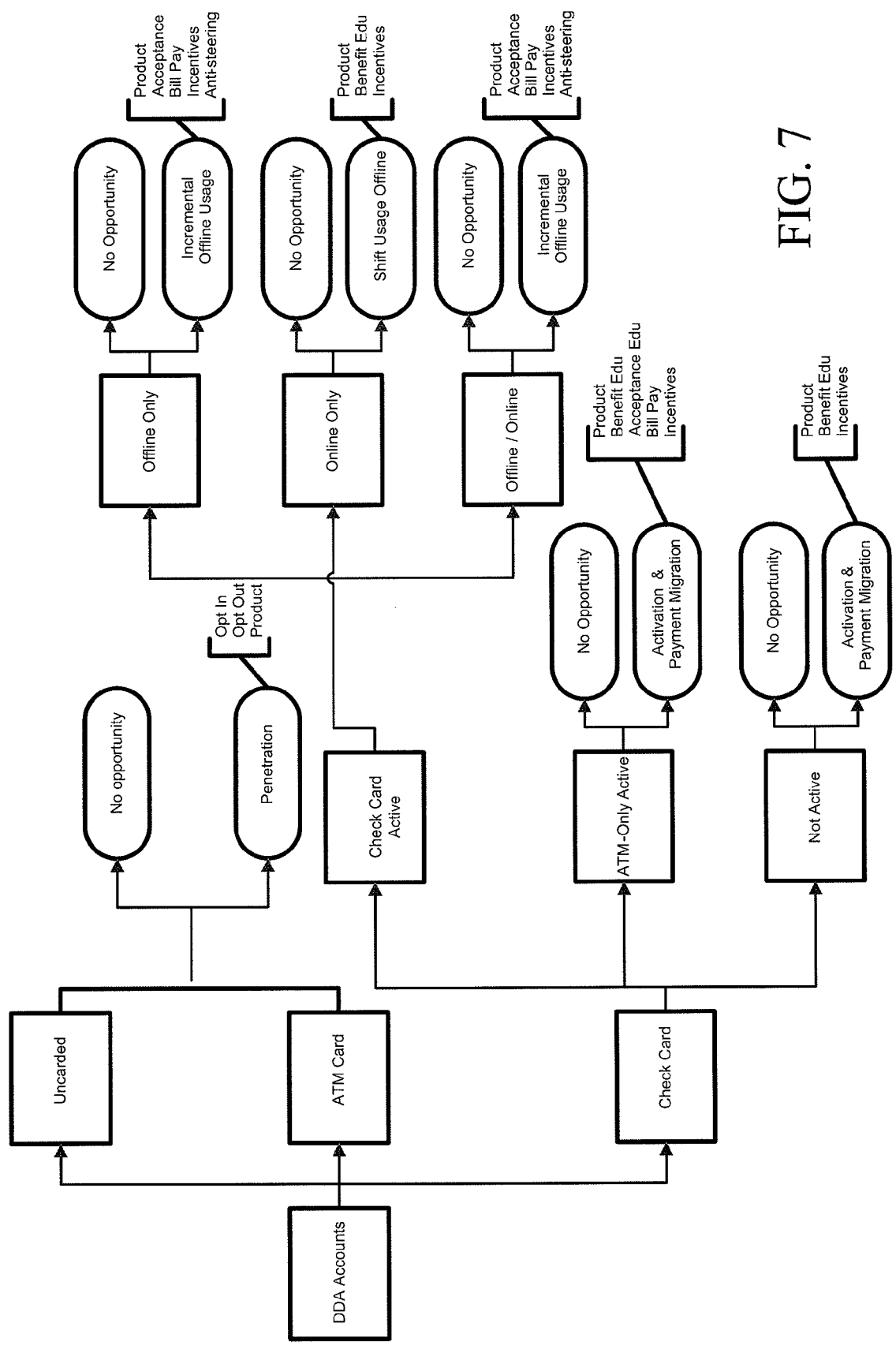
FIG. 7 represents an illustrative segmentation of DDA data for debit product offerings.
Figure 8:
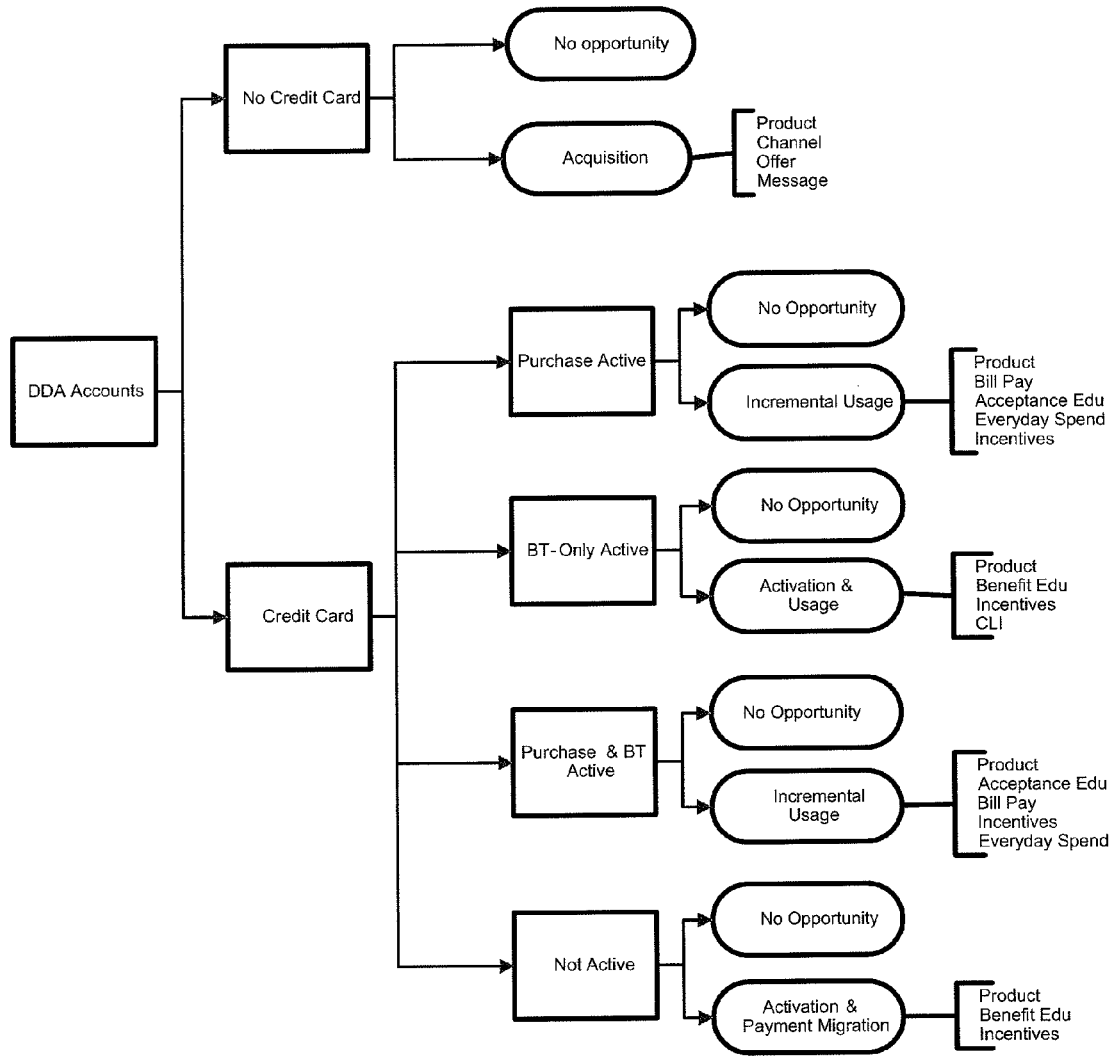
FIG. 8 represents an illustrative segmentation of DDA data for credit product offerings.

Referring now to FIGS. 7 and 8, the figures show decision trees which identify classes of customers that may be modeled by segmenting the financial database of the financial institution (e.g., a DDA account database) in accordance with the present invention. For example, FIG. 7 represents various classes or populations of customers where opportunities may exist for selling different debit products, or for driving continued or increased use of existing debit products. FIG. 8 similarly represents various classes or populations of customers where opportunities may exist for selling different credit products, or for driving continued or increased use of existing credit products.

FIG. 7 illustrates a decision tree for various opportunities to sell debit products to various classes of customers. Segmentation of a financial institution's financial database in accordance with an embodiment of the present invention may identify such classes (populations, groups) of customers. When such customers can be modeled, then the decision tree in FIG. 7 can then be employed to identify the kinds of offers or incentives that may be communicated to customers identified by such models.

Referring to FIG. 7 and viewing the tree from the left, we begin with the accounts of all the customers. A class of customers can be identified who are "Uncarded" meaning they do not have either a debit card product or a credit card product. A class called "ATM Card" customers is shown, representing customers who have only an ATM card. Each class represents either a penetration opportunity for selling a debit product to those customers, or no opportunity. Where there is a penetration opportunity to introduce a new product, the engagement activities by which such introduction may be made are shown by the bullet items shown in the bracketed text.

A class called "Check Card" represents those customers who own a debit card. Such customers can be further categorized as Check Card Active, ATM-Only Active, or Not Active. The latter two categories, ATM-Only Active and Not Active, represent either no opportunity for product introduction or an opportunity to incentivize activation of the card in an attempt to influence migration of the customer's payment practices toward using the card for making payments.

Returning to the Check Card Active class of customers, such customers may be further categorized into Offline Only, Online Only, and Offline/Online customers. Offline customers are those who validate transactions using their signatures, as compared to Online customer who validate transactions using their PIN (personal ID number). Signature transactions provide interchange revenue income to the financial institution, whereas PIN transactions do not. Therefore, there is an incentive to urge customers toward signature transaction based purchases.

Accordingly, for the class of Check Card Active customers who are Offline Only users, an opportunity exists to attempt to increase usage by those customers using such activities as product offerings, informing the customer of additional places that accept signature-based transaction, incentives, and so on. For customers who are Online Only users, an opportunity exists to shift usage to engage in more signature-based transactions rather than PIN-based transactions. For customers who are Offline/Online users, the goal is to drive increased offline usage, namely signature-based transactions.

FIG. 8 illustrates a decision tree for various opportunities to sell credit products to various classes of customers. When such customers can be modeled by segmenting the financial institution's financial database in accordance with the present invention, then the decision tree in FIG. 8 can then be employed to identify the kinds of offers or incentives that may be communicated to customers identified by such models.

Referring to FIG. 8 and viewing the tree from the left, we begin with the accounts of all the customers. A class of customers can be identified as not having a credit card (No Credit Card), for whom an opportunity may exist for selling a credit product.

The Credit Card customers can be further categorized into Purchase Active customers, who are actively using their cards. The opportunity for such customers would be to attempt to drive further usage of their cards. Customers who are BT-Only Active are users who made balance transfers to take advantage of lower interest rates but do not otherwise use the card. Opportunities exist for incentivizing such customers to activate and use their card. Customers who are Purchase and BT Active are balance transfer customers who actively use their cards. The goal for such customers is to increase their usage of the card. Finally, for Not Active customers, the goal is for the customer to activate and use their card.

Figure 9:
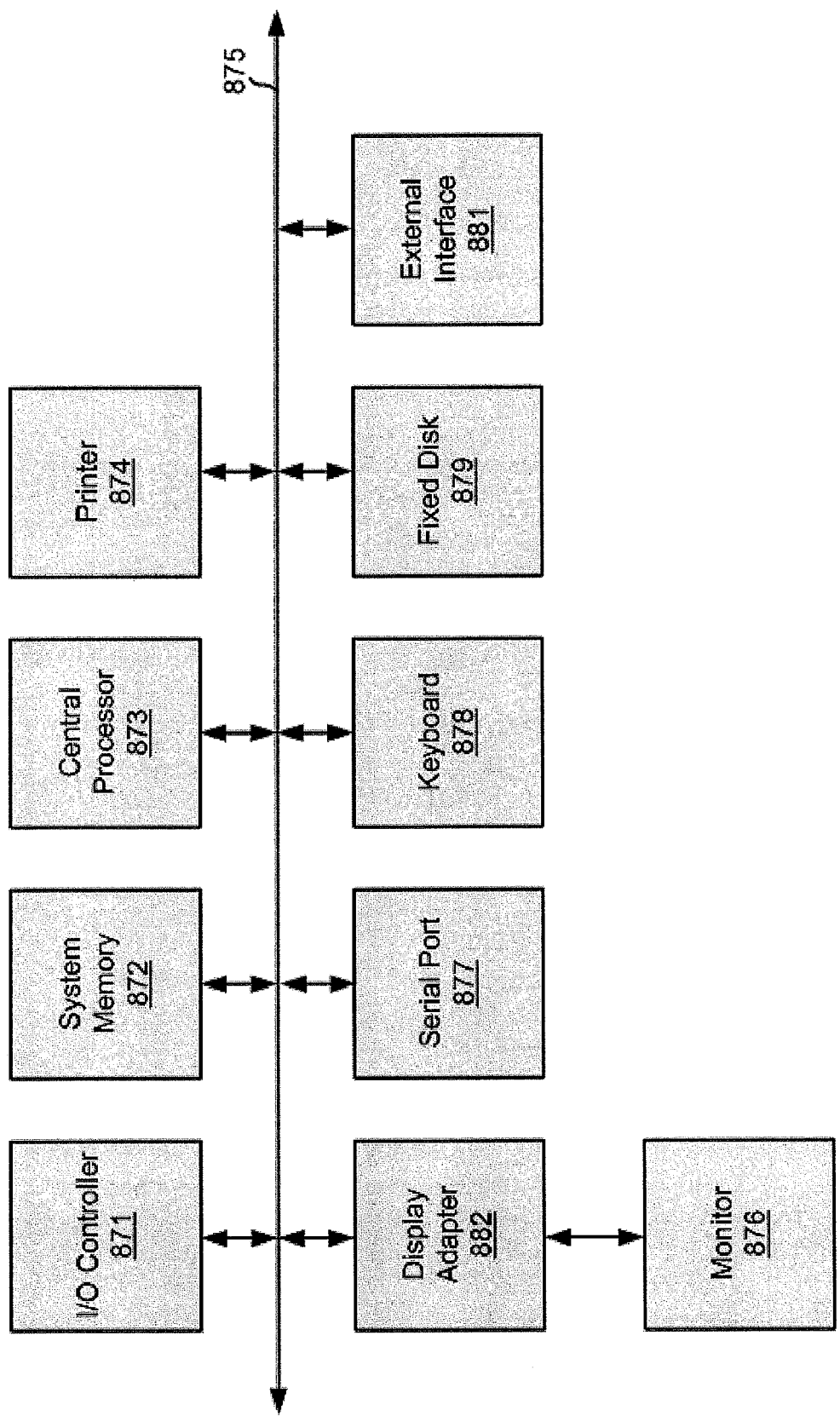
FIG. 9 illustrates a computer apparatus that can be configured to operate in accordance with embodiments of the present invention.

Any of the entities or components described above may include one or more of the subsystems or components shown in FIG. 9, which is a block diagram of a computer system such as shown in FIG. 3. The subsystems shown in the figure may be interconnected via a system bus 875. Additional subsystems may be provided such as a printer 874, keyboard 878, fixed disk 879, monitor 876, which can be coupled to display adapter 882, and others are shown. Peripherals and input/output (I/O) devices, which couple to I/O controller 871, can be connected to the computer system by any number of means known in the art, such as serial port 877. For example, serial port 877 or external interface 881 can be used to connect the computer apparatus to a wide area network such as the Internet, a mouse input device, or a scanner. The interconnection via system bus allows the central processor 873 to communicate with each subsystem and to control the execution of instructions from system memory 872 or the fixed disk 879, as well as the exchange of information between subsystems. The system memory 872 and/or the fixed disk 879 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A method for identifying customers of a financial institution for product offerings comprising operating a computer to perform the steps of:
    receiving, at the computer, from one or more financial information databases, financial data of customers of said financial institution and their accounts, the financial data comprising variables;
    based on the financial data, identifying one or more clusters of customers from among the customers;
    identifying a financial product to be associated with a first cluster of customers; and
    identifying, by the computer, a subset of variables from among the variables of the financial data wherein the subset of variables characterizes customers who have a propensity to respond positively to an offer;
    wherein the financial data comprises financial accounts of the customers of the financial institution;
    wherein the financial data further comprises financial information from a debit usage database or a credit usage database; and
    wherein the subset of variables includes at least two or more of a total number of deposits made into a user's financial account, duration as a user of the financial account, whether or not online banking is used, a number of transfers into the financial account, a FICO score, a user's age, a number of times logging onto the financial account, whether or not a money market account is owned, an age of the most recent account, a total amount spent using checks, a total sum of ATM (automated teller machine) debits made in a period of time, or a total number of transactions made at an ATM.

2. The method of claim 1 wherein the offer is an offer for a debit card.

3. A method for identifying customers of a financial institution for product offerings comprising operating a computer to perform steps of:
    receiving, from one or more financial information databases, financial data of customers of said financial institution and their accounts, the financial data comprising variables;
    based on the financial data, identifying one or more clusters of customers from among the customers;
    identifying a financial product to be associated with a first cluster of customers; and
    identifying, by the computer, a subset of variables from among the variables of the financial data wherein the subset of variables characterize customers who have a propensity to respond positively to an offer;
    wherein the financial data comprises financial accounts of the customers of the financial institution;
    wherein the financial data further comprises financial information from a debit usage database or a credit usage database; and
    wherein the subset of variables includes at least two or more of a total number of transfers made from a user's financial account, duration as a user of the financial account, a number of times logging onto the financial account, an end of month balance for a consumer loan, a negative indication score, whether or not online banking is used, employment status, or member affiliation.

4. The method of claim 3 wherein the offer is an offer for a credit card.

5. A method for identifying customers of a financial institution for product offerings comprising operating a computer to perform steps of:
    receiving, from one or more financial information databases, financial data of customers of said financial institution and their accounts, the financial data comprising variables;
    based on the financial data, identifying one or more clusters of customers from among the customers;
    identifying a financial product to be associated with a first cluster of customers; and
    identifying, by the computer, a subset of variables from among the variables of the financial data wherein the subset of variables characterize customers who have a propensity to respond positively to an offer;
    wherein the financial data comprises financial accounts of the customers of the financial institution;
    wherein the financial data further comprises financial information from a debit usage database or a credit usage database; and
    wherein the subset of variables includes at least two or more of a duration since last debit transaction, a number of end-of-month purchases, interest paid, duration since last activity on the account, a behavioral score, a minimum payment due, a current cash balance, whether or not there is a certificate of deposit, a number of times logging onto the financial account, an end of month balance on a money market account, or an overall statement balance.

6. The method of claim 5 wherein the offer is an offer for a second credit card.

7. A method for identifying customers of a financial institution for product offerings comprising operating a computer to perform steps of:
    receiving, by the computer, from one or more financial information databases, financial data of customers of said financial institution and their accounts, the financial data comprising variables;
    based on the financial data, identifying one or more clusters of customers from among the customers;
    identifying a financial product to be associated with a first cluster of customers; and
    identifying a subset of variables from among the variables of the financial data wherein the subset of variables characterize customers who have a propensity to respond positively to an offer;
    wherein the financial data comprises financial accounts of the customers of the financial institution;
    wherein the financial data further comprises financial information from a debit usage database or a credit usage database; and
    wherein the subset of variables includes at least two or more of an indication of whether or not an ATM card was used in previous twelve months, average end of month balance, average amount of surcharge fees, a number of times logging onto the financial account, number of times a call is made to an automated voice service, an end of month balance on a checking account, and a FICO score.

8. The method of claim 7 wherein the offer is an offer to resume use of a debit card that had not been in use for a predetermined period of time.

9. A system for financial product offerings comprising:
a computer system; and
a first data source having stored therein financial data for customers of a financial institution, the financial data comprising variables that characterize accounts owned by the customers and the customers,
the computer system configured to perform steps comprising:
  receiving the financial data from the first data source;
  identifying one or more clusters of customers from among the customers;
  for each cluster of customers, identifying an associated financial product to be associated with said each first cluster; and
  for said each cluster, identifying a subset of variables from the variables comprising the financial data, wherein the subset of variables identify customers who have a propensity to respond positively to an offer;
wherein the subset of variables includes at least two or more of a total number of deposits made into a user's financial account, duration as a user of the financial account, whether or not online banking is used, a number of transfers into the financial account, a FICO score, a user's age, a number of times logging onto the financial account, whether or not a money market account is owned, an age of the most recent account, a total amount spent using checks, a total sum of ATM (automated teller machine) debits made in a period of time, or a total number of transactions made at an ATM.

10. A system for financial product offerings comprising:
a computer system; and
a first data source having stored therein financial data for customers of a financial institution, the financial data comprising variables that characterize accounts owned by the customers and the customers,
the computer system configured to perform steps comprising:
  receiving the financial data from the first data source;
  identifying one or more clusters of customers from among the customers;
  for each cluster of customers, identifying an associated financial product to be associated with said each first cluster; and
  for said each cluster, identifying a subset of variables from the variables comprising the financial data, wherein the subset of variables identify customers who have a propensity to respond positively to an offer;
wherein the subset of variables includes at least two or more of a total number of transfers made from a user's financial account, duration as a user of the financial account, a number of times logging onto the financial account, an end of month balance for a consumer loan, a negative indication score, whether or not online banking is used, employment status, or member affiliation.

11. A system for financial product offerings comprising:
a computer system; and
a first data source having stored therein financial data for customers of a financial institution, the financial data comprising variables that characterize accounts owned by the customers and the customers,
the computer system configured to perform steps comprising:
  receiving the financial data from the first data source;
  identifying one or more clusters of customers from among the customers;
  for each cluster of customers, identifying an associated financial product to be associated with said each first cluster; and
  for said each cluster, identifying a subset of variables from the variables comprising the financial data, wherein the subset of variables identify customers who have a propensity to respond positively to an offer;
wherein the subset of variables includes at least two or more of a duration since last debit transaction, a number of end-of-month purchases, interest paid, duration since last activity on the account, a behavioral score, a minimum payment due, a current cash balance, whether or not there is a certificate of deposit, a number of times logging onto the financial account, an end of month balance on a money market account, or an overall statement balance.

12. A system for financial product offerings comprising:
a computer system; and
a first data source having stored therein financial data for customers of a financial institution, the financial data comprising variables that characterize accounts owned by the customers and the customers,
the computer system configured to perform steps comprising:
  receiving the financial data from the first data source;
  identifying one or more clusters of customers from among the customers;
  for each cluster of customers, identifying an associated financial product to be associated with said each first cluster; and
  for said each cluster, identifying a subset of variables from the variables comprising the financial data, wherein the subset of variables identify customers who have a propensity to respond positively to an offer;
wherein the subset of variables includes at least two or more of an indication of whether or not an ATM card was used in previous twelve months, average end of month balance, average amount of surcharge fees, a number of times logging onto the financial account, number of times a call is made to an automated voice service, an end of month balance on a checking account, and a FICO score.

* * * * *